US012790005B2

United States Patent

(12) United States Patent
Schwartz

(10) Patent No.: US 12,790,005 B2
(45) Date of Patent: Nov. 10, 2026

(54) DE-ICING COMMUNICATION SYSTEMS AND METHODS FOR AN AIRCRAFT

(71) Applicant: The Boeing Company, Arlington, VA (US)

(72) Inventor: Samantha A. Schwartz, Castle Pines, CO (US)

(73) Assignee: The Boeing Company, Arlington, VA (US)

(*) Notice: Subject to any disclaimer, the term of this patent is extended or adjusted under 35 U.S.C. 154(b) by 300 days.

(21) Appl. No.: 18/455,746

(22) Filed: Aug. 25, 2023

(65) Prior Publication Data

US 2025/0066025 A1 Feb. 27, 2025

(51) Int. Cl.
*B64D 15/20* (2006.01)

(52) U.S. Cl.
CPC .................................... *B64D 15/20* (2013.01)

(58) Field of Classification Search
CPC .................................. B64D 15/20; B64F 5/20
See application file for complete search history.

(56) References Cited

U.S. PATENT DOCUMENTS

2009/0170434 A1* 7/2009 Tengler .................. H04L 67/14 455/41.2
2015/0081141 A1* 3/2015 Campbell ................ B64F 5/23 701/3
2018/0273211 A1* 9/2018 Chang .................... B64D 13/06
2019/0202568 A1* 7/2019 Borup .................... B64D 15/12
2021/0090443 A1* 3/2021 Viswanath ............... G08G 5/51
2022/0194576 A1* 6/2022 Yang ...................... G06F 40/40
2023/0219698 A1* 7/2023 Campbell ............... B64D 43/00 701/3

OTHER PUBLICATIONS

"Holdover Time (HOT)", Feb. 8, 2023, SKYbrary (Year: 2023).*

* cited by examiner

*Primary Examiner* — Erin M Piateski
*Assistant Examiner* — Eisen Yim
(74) *Attorney, Agent, or Firm* — Mary D. Lawlor; Carroll, Hoette & Butscher, LLC

(57) ABSTRACT

A system and a method include a first communication system onboard an aircraft and a control unit having one or more processors that determine that one or more ambient conditions require a de-icing event of the aircraft, determine a location of the aircraft, and a status of one or more systems of the aircraft. The first communication system establishes a bi-directional communication link with a second communication system of a de-icing system. The first communication system receives one or more command messages from the second communication system indicating a status of the de-icing event. The control unit changes one or more operating settings of the aircraft responsive to completion of the de-icing event.

20 Claims, 7 Drawing Sheets

DE-ICING COMMUNICATION SYSTEMS AND METHODS FOR AN AIRCRAFT

FIELD OF THE DISCLOSURE

Examples of the present disclosure generally relate to communication systems and methods, such as used during a de-icing event for an aircraft.

BACKGROUND OF THE DISCLOSURE

Certain aircraft may be required to receive a de-icing and/or anti-icing treatment before being allowed to depart from an airport. The requirement for receiving the de-icing and/or anti-icing treatment may be based on one or more current or forecasted weather conditions. For example, if current ambient temperatures are below a determined temperature threshold, if determined levels of precipitation are present, then aircrafts may need to be de-iced or receive an anti-icing treatment to ensure that wings, stabilizers, and other exterior surfaces of the aircraft are free from ice.

However, communication between an aircraft and a system that applies the de-icing materials to the aircraft before, during, and after a de-icing event can be inconsistent. For example, there may not be an established communication pathway between the pilot and operator controlling operation of the de-icing system. Additionally, there may be a delay in time between completion in the de-icing treatment and the time the pilot is made aware that the de-icing event is completed. In certain weather conditions, the aircraft may need to depart from the airport at a specific time after the start of an anti-icing material being applied to the aircraft. For example, a holdover time that the aircraft has between the start of the application of the anti-icing treatment and when the aircraft must depart can be limited based on the current weather conditions. If the pilot is unaware of the start time at which the anti-icing material is applied to the aircraft, the aircraft may not be able to depart from the aircraft within the specified holdover time. For example, a lapse in time may occur, thereby preventing the aircraft from reaching the runway in time to allow the aircraft to depart within the holdover time. If the aircraft is unable to depart from the airport within the holdover time, then the aircraft may be required to receive another de-icing treatment, thereby causing a delay in the scheduled travel time of the aircraft.

SUMMARY OF THE DISCLOSURE

A need exists for a system and a method for establishing a communication link between an aircraft system and a de-icing system. Further, a need exists for a system that allows a pilot of the aircraft to receive status updates associated with a de-icing event, including a start time and a time of completion of an application of a de-icing material and/or an anti-icing material.

With those needs in mind, certain examples of the present disclosure provide a system for communicating between an aircraft and a de-icing system prior to a de-icing event, during the de-icing event, and subsequent to the completion of the de-icing event. The system can include a first communication system onboard an aircraft, and a control unit having one or more processors. The processors can determine that one or more ambient conditions require a de-icing event of the aircraft. For example, the ambient conditions can be based on current and/or forecasted weather conditions. The control unit determines a location of the aircraft, and a status of one or more systems first the aircraft (e.g., a propulsion system, a brake system, a power unit, a communication system, or the like). The first communication system establishes a bi-directional communication link with a second communication system of the de-icing system, such as a communication system that is disposed off-board the aircraft. The first communication system and the second communication system can communicate command messages between the aircraft and the de-icing system, such as messages indicating a status of the de-icing event. Responsive to completion of the de-icing event, the control unit changes one or more operating settings of the aircraft, such as to control movement of the aircraft from the de-icing location (e.g., a de-icing pad) to another location (e.g., the end of a runway from which the aircraft will takeoff).

In at least one example, the first communication system of the aircraft can receive a completion notice from the second communication system of the de-icing system that indicates the completion of the de-icing event. In another example, the control unit can open the bi-directional communication link responsive to the first communication system receiving the completion notice. The first communication system can be prohibited from communicating with the second communication system of the de-icing system responsive to the bi-directional communication link opening.

In at least one example, the completion notice may include one or more instructions for controlling operation of the aircraft responsive to the completion of the de-icing event. In another example, the one or more instructions can include a transit deadline. The aircraft may be required to depart before the transit deadline. In another example, the de-icing event may include a first portion and a second portion that is configured to be completed subsequent to completion of the first portion. The transit deadline may be based on a start time of the second portion of the de-icing event.

In at least one example, the control unit can select one or more materials to be used in the de-icing event. The materials that are selected can be based on the one or more ambient conditions. In another example, the first communication system communicates a command message to the second communication system indicating the one or more materials that are selected for the de-icing event.

In at least one example, the location of the aircraft may be a first location. The control unit can control a propulsion system of the aircraft to move the aircraft from a first location to a second location responsive to the completion of the de-icing event.

In at least one example, the status of the one or more systems can include one or more of a setting of a power system of the aircraft, a brake setting of the aircraft, a setting of the first communication system, an engine setting of a propulsion system of the aircraft, a time at which the engine setting changed, a setting of a thermal management system of the aircraft, or the setting of the thermal management system relative to the engine setting.

Certain examples of the present disclosure provide a method that includes determining that one or more ambient conditions require a de-icing event of an aircraft, determining a location of the aircraft, and determining a status of one or more systems of the aircraft. A bi-directional communication link is configured to be established between a first communication system disposed onboard the aircraft and a second communication system of a de-icing system disposed off-board the aircraft. One or more command messages indicating a status of the de-icing event may be received, such as by the first communication system. Responsive to completion of the de-icing event, one or more operating settings of the aircraft may be changed.

Certain examples of the present disclosure provide a non-transitory computer-readable storage medium comprising executable instructions that, in response to execution, cause one or more control units comprising a processor to perform operations that include determining that one or more ambient conditions require a de-icing event of an aircraft, determining a first location of the aircraft, and determining a status of one or more systems of the aircraft. A bi-directional communication link is configured to be established between a first communication system of the aircraft and a second communication system of a de-icing system. One or more command messages indicating a status of the de-icing event may be received, such as by the first communication system. A completion notice indicating completion of the de-icing event may be received by the first communication system. The completion notice can include one or more instructions for controlling operation of the aircraft responsive to the completion of the de-icing event. Responsive to completion of the de-icing event and receiving the completion notice, one or more operating settings of the aircraft may be changed to control movement of the aircraft from the first location to a different, second location. Responsive to receiving the completion notice, the bi-directional communication link may be opened. The first communication system may be prohibited from communicating with the second communication system of the de-icing system responsive to the bi-directional communication link opening.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Pilots need to determine how long the aircraft has between the start of a de-icing event and a time at which the aircraft needs to depart from the airport based on current and/or forecasted weather conditions. The pilots of the aircraft need to be able to communicate directly with the de-icing system before, during, and after the de-icing event to determine a holdover time before the aircraft is required to depart from the airport. The systems and methods provide a communication system for establishing a bi-directional communication link between the aircraft and the de-icing system to allow the pilot to directly communication with the de-icing system. The bi-directional communication system can allow the pilot to communicate to the de-icing system what de-icing and/or anti-icing materials are to be applied to the aircraft, and to allow the de-icing system to communicate to the aircraft when the different portions of the de-icing event have begun and when the different portions of the de-icing event have been completed.

Figure 1:
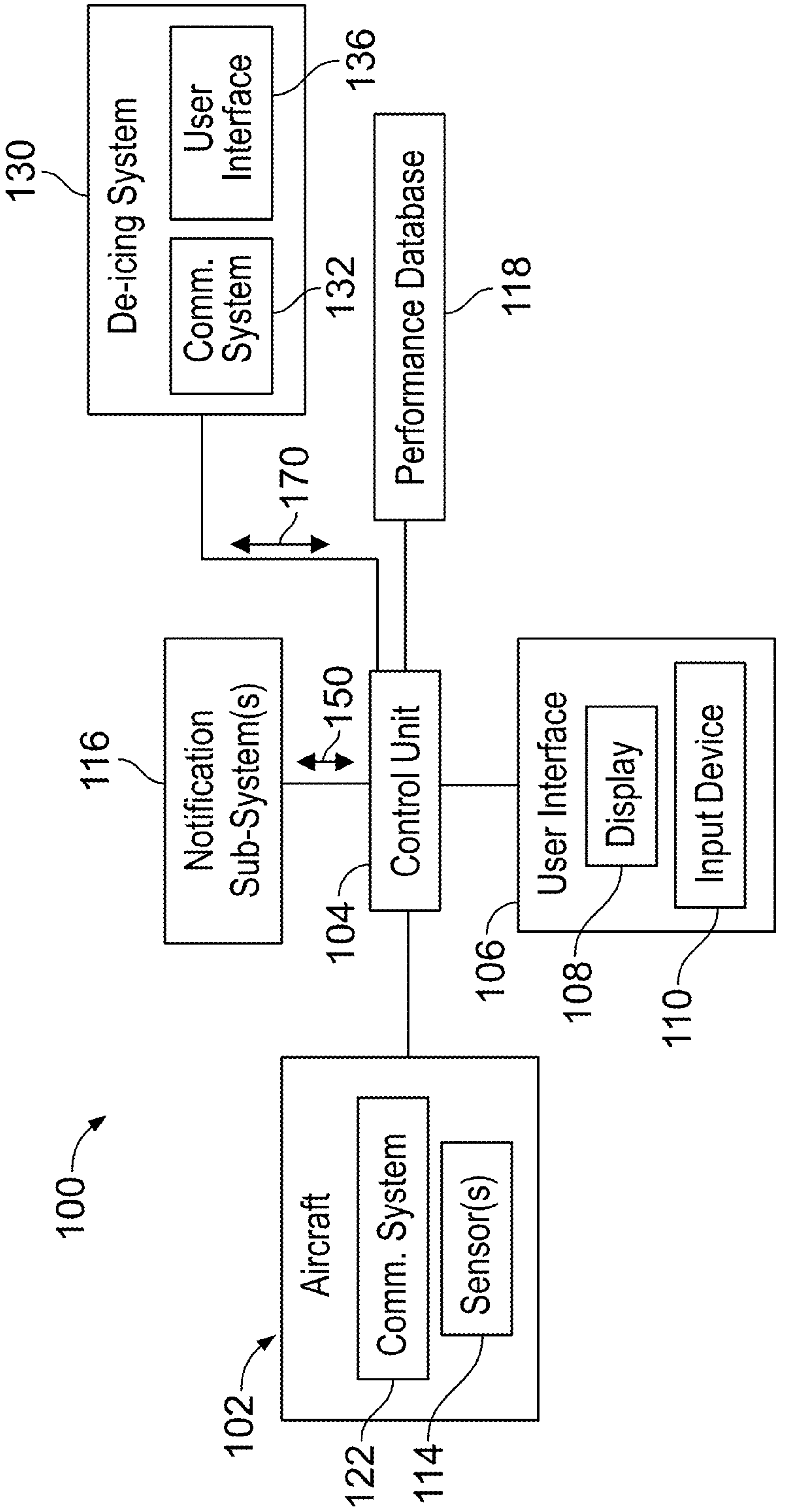
FIG. 1 illustrates a schematic block diagram of a system for communicating during a de-icing event of an aircraft, according to an example of the present disclosure.

FIG. 1 illustrates a schematic block diagram of a system 100 for communicating information between an aircraft 102 and a de-icing system 130 before, during, and after a de-icing event of the aircraft 102. The system 100 includes a control unit 104 having one or more processors in communication with a user interface 106, such as through one or more wired or wireless connections. The user interface 106 can include a display 108 and an input device 110. For example, the display 108 may be an electronic monitor, television, touch screen, and/or the like, and the input device 110 can be and/or include a keyboard, a mouse, a stylus, and/or the like. In at least one example, the display 108 and the input device 110 are integrated as a touchscreen interface. In at least one example, the user interface 106 is a computer workstation. As another example, the interface 106 can be a handheld device, such as a smartphone, smart tablet, or the like. In at least one example, the control unit 104 and the user interface 106 are at a common location, such as onboard the aircraft 102, a central monitoring location, or the like. As another example, the control unit 104 and the user interface 106 can be remote from each other.

In at least one example, the aircraft 102 can include the user interface 106, such as within an internal cabin. In at least one example, each of plural aircrafts 102 can include a user interface 106. In at least one example, each aircraft 102 can include a control unit 104 and a user interface 106. For example, the control unit 104 can be part of a flight management computer onboard an aircraft. Optionally, the control unit 104 can be remotely located from the aircraft 102, and in communication with the aircraft 102 through a first communication system 122 onboard the aircraft 102. For example, the first communication system 122 can include and/or represent one or more antennas, transceivers, radios, and/or the like. In one or more examples, the first communication system 122 may herein be referred to as an onboard communication system 122.

The aircraft 102 includes one or more sensors 114 that sense or detect information associated with the aircraft 102, one or more different systems of the aircraft, a location of the aircraft (e.g., a location at an airport, a location of the aircraft in an airspace, or the like), information associated with the aircraft 102 relative to another aircraft or another structure, or the like. For example, the one or more sensors 114 can include and/or represent one or more of a global positioning system sensor, a radar system, thermal sensors, vibrational sensors, or the like. In at least one example, the sensor 114 can be an ADS-B transmitter configured to output an ADS-B OUT signal.

The control unit 104 is also in communication with one or more notification sub-systems 116, such as through one or more wired or wireless connections, and can receive notifications 150 from the notification sub-systems 116. The control unit 104 can be remotely located from the notification sub-systems 116, and in communication with the notification sub-systems 116 through one or more antennas, transceivers, radios, communication networks (such as private and/or public internet communications), and/or the like.

In at least one example, the notification sub-systems 116 include Notice to Air Missions (NOTAMs) communication service. A NOTAM is a notice containing information provided to flight personnel. A NOTAM indicates a real-time and abnormal status of a national airspace system.

In at least one example, the notification sub-systems 116 include Meteorological Aerodrome Reports (METAR) communication service. A METAR provides an observation of current surface weather at an airport.

In at least one example, the notification sub-systems 116 includes Terminal Aerodrome (TAF) communication service. A TAF provides a forecast of future weather at an airport.

The control unit 104 is also in communication with a performance database 118 that stores performance data for the aircraft 102. In at least one example, the performance database 118 can be onboard the aircraft 102, such as within a flight computer. As another example, the performance database 118 is remote from the aircraft 102. In at least one example, the performance database 118 is co-located with the control unit 104. As another example, the performance database 118 is remote from the control unit 104.

The performance data includes information regarding operational capabilities of the aircraft 102. For example, the performance data includes information regarding how long it takes for the aircraft 102 to be de-iced (e.g., based on the shape and/or size of the aircraft). In at least one example, the performance data includes information regarding how long it takes for the aircraft to travel from a de-icing location (e.g., a de-icing pad) to the end of a runway (e.g., based on a weight of the aircraft, based on the size of the aircraft, based on speed limitations of the aircraft, based on speed restrictions, based on an amount of fuel the aircraft is permitted to use to reach the runway, or the like). In at least one example, the performance data includes one or more performance models for the aircraft 102. The performance models for the aircraft 102 can be predetermined and/or stored in a memory.

The control unit 104 is also in communication with a de-icing system 130. The de-icing system may include equipment used to complete a de-icing event of the aircraft 102 (e.g., conduits and/or tubing, de-icing materials, anti-ice materials, sprayers, nozzles, pumps, fluid storage vessels, or the like). Additionally, the de-icing system may include a user interface 136 that may be display information to an operator controlling the de-icing system. In at least one example, the de-icing system 130 includes a second communication system 132 that can include and/or represent one or more antennas, transceivers, radios, and/or the like. For example, the second communication system 132 may be referred to herein as an off-board communication system that communicates with the control unit 104 and the aircraft 102 through one or more wired and/or wireless connections.

In one or more examples, the de-icing system 130 may include a controller (not shown) that can include one or more processors that control one or more components of the de-icing system, that determine one or more states of the de-icing system (e.g., is a de-icing material being directed out of a sprayer, is an anti-icing material being directed out of the sprayer, a level of available de-icing and anti-icing materials, or the like). In one example, the controller of the de-icing system 130 may be a handheld device, such as a smartphone, smart tablet, or the like. As one example, the controller of the de-icing system 130 may be associated with a portable electronic flight bag.

Figure 2:
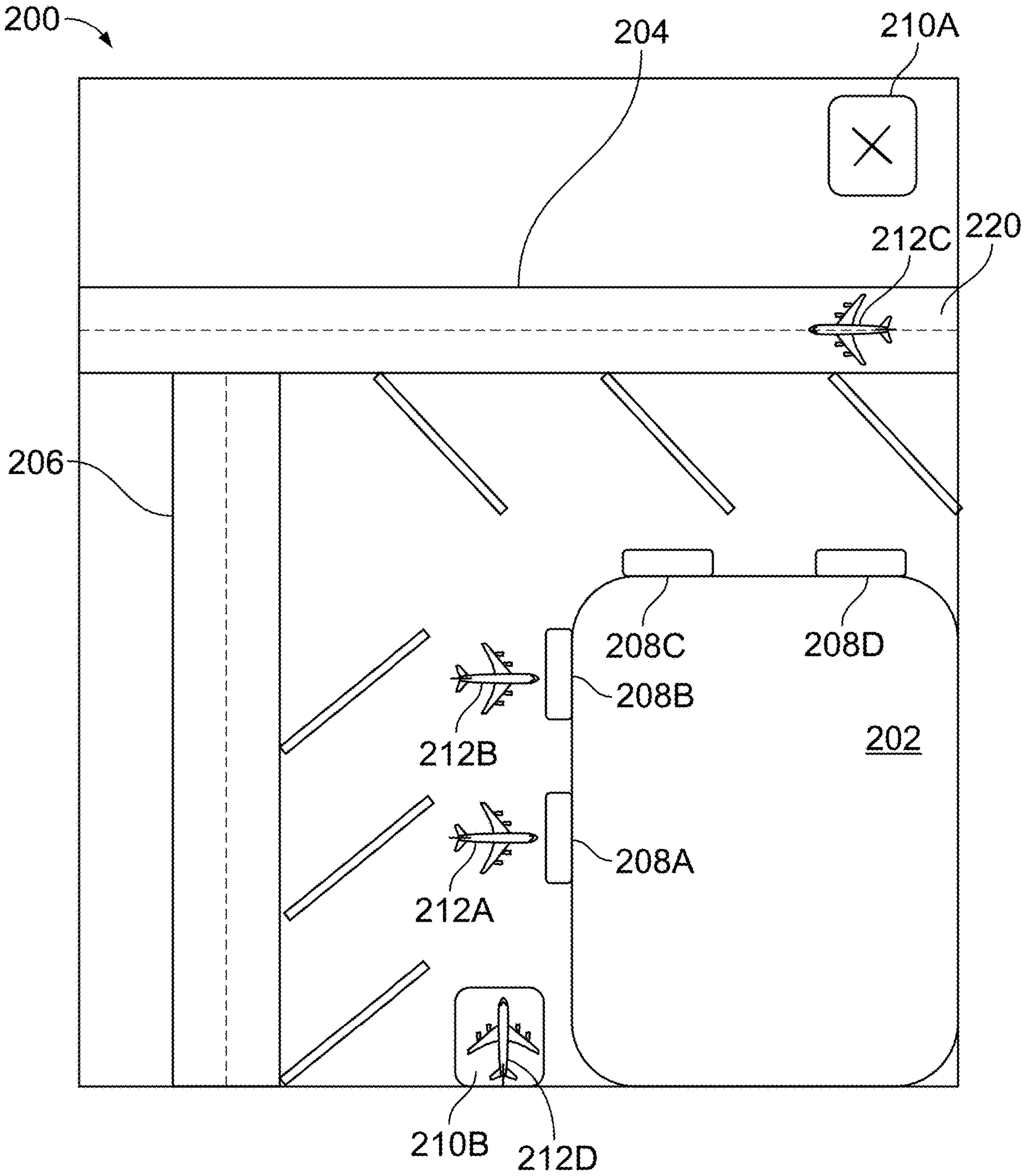
FIG. 2 illustrates a simplified view of an airport, according to an example of the present disclosure.

FIG. 2 illustrates a simplified view of an airport 200 according to an example of the present disclosure. The airport 200 includes runways 204, 206 from which aircrafts 212A-D can take-off or land. In the illustrated example, the airport 200 includes a terminal 202 having plural gates 208A-D that allow access between the terminal 202 and the aircrafts 212A-D.

In at least one example, the airport 200 includes a first de-icing pad 210A and a second de-icing pad 210B. Based on weather conditions at the airport 200, the aircrafts 212A-D may be required to receive a de-icing treatment and/or an anti-icing treatment before the aircrafts 212A-D are allowed to depart from the airport 200. For example, ambient weather conditions (e.g., ambient temperatures, ambient pressures, condensation levels, cloud elevations, visibility conditions, or the like) at the airport may be determined and/or detected. The aircrafts 212A-D may be required to receive a de-icing treatment and/or the anti-icing treatment if one or more of the ambient weather conditions meets or exceeds a determined limit or threshold. As one example, the icing conditions that require a de-icing event may exist if clouds are at a ceiling height that is less than about 1,000 feet (e.g., about 300 meters), if the ambient temperature is about or less than 10° Celcius, if there is visible moisture (e.g. sleet, snow, or the like) in the atmosphere, or the like. In other examples, additional and/or alternative icing conditions may need to be met, the icing conditions may have alternative threshold criteria, or any combination therein.

As described herein, the system 100 includes the control unit 104, which is configured to determine if one or more ambient conditions have been met and require a de-icing event of the aircraft 102. The de-icing event may include a de-icing treatment (e.g., if ice is present on an exterior surface of the aircraft 102, and/or an anti-icing treatment if weather conditions are present that could cause ice to form on exterior surfaces of the aircraft if an anti-icing treatment is not completed).

Referring to FIGS. 1 and 2, in operation, the control unit 104 is configured to determine a location of the aircraft 102 (e.g., if the aircraft 102 is at a gate, is in transit, is at a de-icing pad, or the like) and determine a status of one or more different systems of the aircraft 102 (e.g., a propulsion system, a brake system, a thermal management system such as heaters, fans, or other thermal control devices, a status of a power unit, or the like). The control unit 104 is configured to establish a bi-directional communication link 170 with the second communication system 132 of the de-icing system 130. Responsive to the bi-directional communication link 170 being established, the control unit 104 (e.g., and the aircraft 102) may be permitted to communicate with the de-icing system 130. The messages communicated between the control unit 104 and the de-icing system 130 may include command messages, status updates, instructions, completion notices, or the like. For example, the pilot may be able to communicate directly with the de-icing system 130 before, during, and after completion of a de-icing event of the aircraft 102. In at least one example, the bi-directional communication link 170 between the control unit 104 and the de-icing system 130 can be opened, separated, ended, broken, or the like, subsequent to the completion of the de-icing event, subsequent to a completion command being communicated from the de-icing system 130, or the like.

As described herein, the control unit 104 can automatically (e.g., without human intervention) receive data and/or analyze several data sources to determine if a de-icing event is required, if a location of the aircraft 102 needs to change, if the state of one or more onboard systems satisfy a setting requirement, or the like. In at least one example, the control unit 104 extracts potential procedures, events, and phases of the flight from supplemental information sources, such as traffic, weather, navigation data, and/or NOTAMs in place. Live data for the aircraft 102 is received from onboard systems in case of an onboard usage or from data provision to the ground in case of usage elsewhere.

Figure 3:
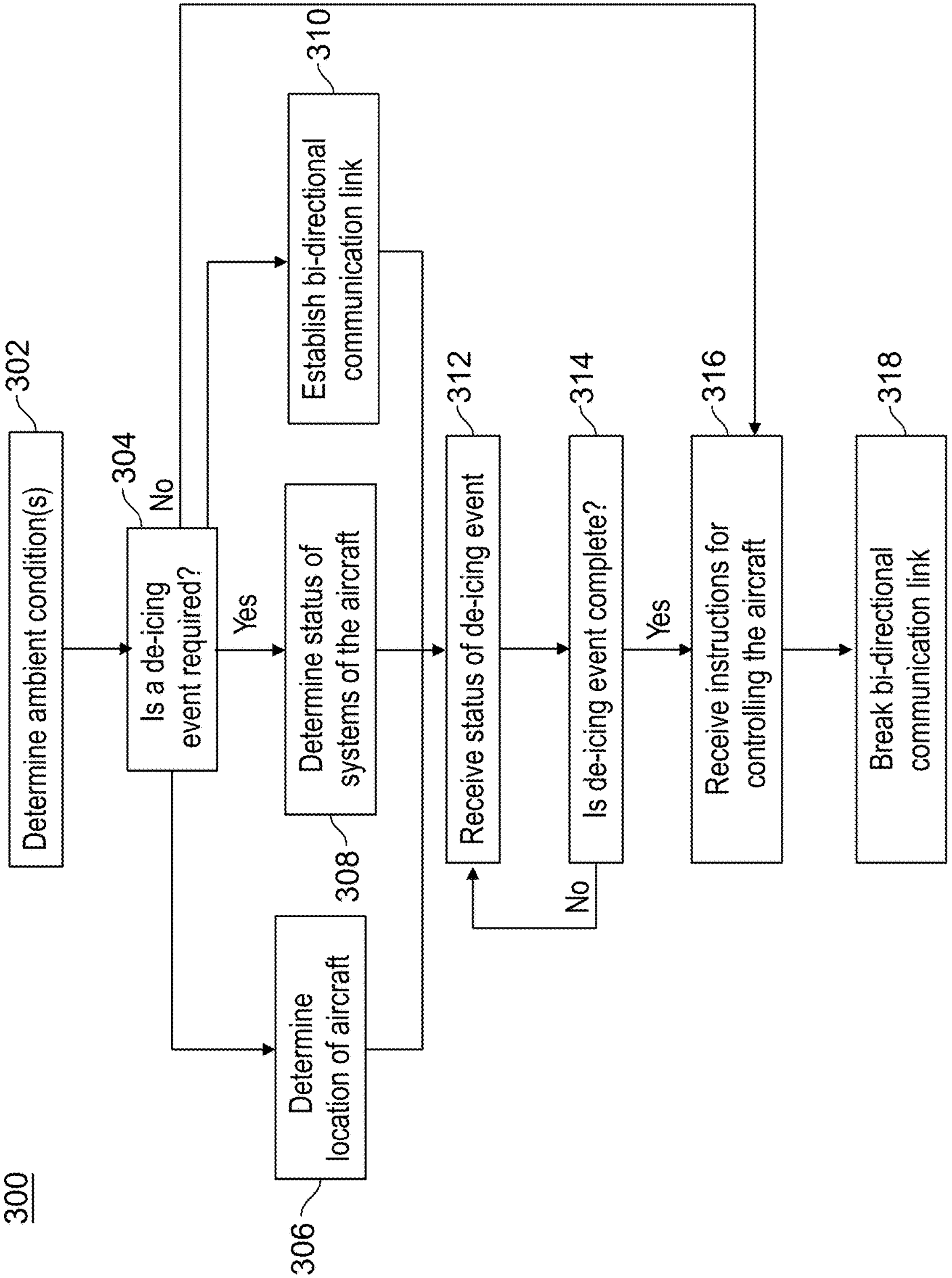
FIG. 3 illustrates a flow chart of a method for communicating between an aircraft and a de-icing system during a de-icing event of the aircraft, according to an example of the present disclosure.

FIG. 3 illustrates a flow chart 300 of a method for communicating between an aircraft 102 and a de-icing system 130 before, during, and after a de-icing event of the aircraft 102, according to an example of the present disclosure. Referring to FIGS. 1-3, at 302, the control unit 104 can determine one or more ambient conditions, such as from information received from one or more sensors 114 of the aircraft 102. The ambient conditions may be associated with the current weather at the airport 200 (e.g., temperature, humidity, precipitation, cloud height above sea level, or the like), forecasted weather conditions at the airport 200 (such as within the next 6 to 12 hours), or the like.

At 304, the control unit 104 can determine if a de-icing event is required based on the ambient conditions at the airport 200. A de-icing event may be required if one or more ambient conditions have met or exceed one or more condition requirements. As another example, the control unit 104 may receive a command message, such as from a central controlling center of the airport 200, that instructs the aircraft 102 to complete a de-icing event. For example, the control unit 104 may not determine that the de-icing event is required, but instead may receive instructions indicating that the de-icing event is required to be completed.

At 304, if a de-icing event is not required, flow of the method proceeds toward 316, and at 316, the control unit 104 receives instructions for controlling the aircraft. The control unit 104 can receive instructions from the de-icing system 130, from a central controlling center of the airport 200, from the performance database 118, or the like. As one example, the instructions can include a runway the aircraft 102 is to depart from, a flight plan, a communication frequency at which the aircraft communication system 122 is to be set, an allowed time (e.g., maximum allowed time) the aircraft has to taxi to the end of the runway, a position in line relative to positions of other departing aircrafts, or the like.

Returning to step 304, if the de-icing event is required, flow of the method proceeds to 306, 308, and 310. The steps 306, 308, and 310 can be completed substantially simultaneously, in a random order, in a determined order, or the like.

At 306, a location of the aircraft is determined (e.g., using a global positioning system, an ADS-B signal, or the like). The location may be at the gate 208A, may be at the de-icing pad 210B, or the like. As one example, the aircraft 212B may be determined to be at a first location (e.g., the gate 208B), and the aircraft 212B may need to move from the first location to a second location (e.g., the de-icing pad 210A) for the completion of a de-icing event of the aircraft 212B. The control unit 104 may determine and/or receive one or more instructions for controlling operation of the propulsion system of the aircraft 212B to move the aircraft 212B to the de-icing pad 210A. As another example, the control unit 104 of the aircraft 212D may determine that the aircraft 212D is at the de-icing pad 210B for a de-icing event of the aircraft 212D.

At 308, a status of one or more systems onboard the aircraft is determined. As one example, the status of an engine of the propulsion system may be determined, a time at which an engine setting changed (e.g., a time when the engine setting was changed from an on-state to an off-state), or the like. The status of a power unit (e.g., an auxiliary power unit) may be determined, the status of a brake system may be determined (e.g., is a parking brake on or off), and a setting of the first communication system 122 (e.g., a frequency at which the first communication system 122 is set) may be determined. The status of a thermal management system may be determined (e.g., the status and/or setting of an engine heater, a fan, or the like), a status and/or setting of the thermal management system relative to the status of the engine system, or the like.

In one or more examples, the status of the one or more systems may indicate that the aircraft is ready to begin a de-icing event. For example, if the engines are off, if the power unit is on, if the aircraft is at a de-icing pad, if an engine heater is on, or the like, then the control unit 104 can determine that the aircraft 102 is ready to begin the de-icing event. In one or more examples, the control unit 104 may control one or more of the systems to change a setting of the one or more systems. For example, the control unit 104 may determine that the engine is on, and may control operation of the aircraft to change the state of the engine from the on state to an off state, such as to prepare the engine for the de-icing event. As another example, the pilot can receive a notification 160 from the control unit 104 via the display 108 instructing the pilot to turn the engines to the off state.

At 310, the bi-directional communication link 170 between the first communication system 122 of the aircraft 102 and the second communication system 132 of the de-icing system 130 is established. As one example, the first communication system 122 can receive a wireless pairing request from the second communication system 132 of the de-icing system 130. As another example, the control unit 104 can determine a communication frequency that the first communication system 122 is to use to establish the bi-directional communication link 170 via a flight management computer. As another example, the control unit 104 can receive a message, such as from the central controlling center of the airport 200, indicating a frequency at which the first communication system 122 is to be set to establish the bi-directional communication link 170 with the second communication system 132 of the de-icing system 130.

In one or more examples, responsive to the bi-directional communication link 170 being established, and the control unit 104 confirming that the one or more systems of the aircraft are in a state for the de-icing event to begin, the control unit 104 may communicate a message to the de-icing system 130 that the de-icing event can begin, that the aircraft 102 is prepared to begin the de-icing event, or the like.

In one or more examples, the message communicated by the control unit 104 via the first communication system 122 to the de-icing system 130 may be a command message indicating one or more materials that the de-icing system 130 is to use for the de-icing event. For example, the aircraft 102 may instruct the de-icing system on what de-icing materials and/or anti-icing materials are to be used during the de-icing event. In one example, the de-icing and/or anti-icing materials that are selected by the control unit 104 may be based on current weather conditions at the airport, based on previous weather conditions at the airport (e.g., within the previous 6 to 12 hours), based on forecasted weather conditions (e.g., within 6 to 12 hours), or the like. For example, the weather conditions may indicate that the aircraft 102 is required to receive a de-icing treatment and an anti-icing treatment before the aircraft 102 is approved to depart from the airport 200. As another example, the conditions may indicate that the aircraft 102 may only be required to receive the anti-icing treatment (e.g., the aircraft 102 does not require the de-icing treatment) before being approved to depart from the airport 200. For example, there may not be ice formed on exterior surfaces of the aircraft 102 that need to be removed during a de-icing treatment, and only an anti-icing treatment may be required.

At 312, the control unit 104 receives messages from the de-icing system 130 via the bi-directional communication link 170 between the first and second communication systems 122, 132. The messages can indicate a status of the de-icing event. As one example, the status may indicate that the de-icing event has begun, a time at which the de-icing event started, an expected time of completion of the de-icing event, an indication of an exterior location of the aircraft currently receiving a treatment, or the like.

In one or more examples, the de-icing event may include plural different portions. For example, a first portion of the de-icing event may be a de-icing treatment in which a de-icing material is applied to exterior surfaces of the aircraft 102. A second portion of the de-icing event may be an anti-icing treatment in which an anti-icing material is applied to the exterior surfaces of the aircraft 102. In one example, the aircraft 102 may require a de-icing treatment and the anti-icing treatment. In another example, the aircraft 102 may only require the anti-icing treatment.

In one example, if the de-icing treatment and the anti-icing treatment are required, then the first portion of the de-icing event (e.g., the de-icing treatment) is completed prior to the start of the second portion of the de-icing event (e.g., the anti-icing treatment). In one example, the de-icing system 130 may communicate a first status message to the control unit 104 indicating a start time of the first portion (e.g., the de-icing treatment), a second status message indicating an end time of the first portion (e.g., the de-icing treatment), a third status message indicating a start time of the second portion (e.g., the anti-icing treatment), and a fourth status message indicating an end time of the second portion (e.g., the anti-icing treatment). In one example, the fourth message may be a completion notice indicating that the de-icing event is completed.

In another example, if the de-icing treatment is not required, and the anti-icing treatment is required, then the de-icing system 130 may complete only the second portion of the de-icing event (e.g., the anti-icing treatment). The de-icing system 130 may communicate a first status message to the control unit 104 indicating a start time of the second portion (e.g., the anti-icing treatment), and a second status message indicating an end time of the second portion of the de-icing event. As one example, the second message may be a completion notice indicating that the de-icing event it completed.

At 314, a determination is made whether the de-icing event is completed. If the de-icing event is not completed, flow of the method returns to 312, and the control unit 104 continues to communicate status messages with the de-icing system 130. Alternatively, if the de-icing event is completed, flow of the method proceeds to 316.

At 316, the control unit 104 receives instructions for controlling the aircraft. The instructions may be received from the de-icing system 130, from a central controlling center of the airport 200, from the performance database 118, as notifications 150 from the notification sub-systems 116, or the like. As one example, the instructions can include a runway the aircraft 102 is to use to depart from the airport 200, a flight plan, a communication frequency at which the aircraft communication system 122 is to be set such as for departure from the airport 200, or the like.

In one example, the instructions may include a transit deadline (e.g., a maximum allowed time) before the aircraft 102 is required to takeoff or depart from the airport 200, or the like. The transit deadline may be based on the current and/or future weather conditions at the airport, based on the materials used for the de-icing event, or the like. In one example, the transit deadline may be based on a start time of the second portion of the de-icing event (e.g., the anti-icing treatment).

At 318, the bi-directional communication link 170 between the first communication system 122 and the second communication system 132 may be opened, broken, separated, ended, or the like. For example, the first communication system 122 may be unable to, prohibited from, prevented from, or the like, communicating with the second communication system 132 subsequent to the bi-directional communication link 170 being opened, broken, ended, or the like. In one example, the de-icing system 130 may need to end the bi-directional communication link 170 with the aircraft 102 in order to establish a bi-directional communication link with another aircraft.

Figure 4:
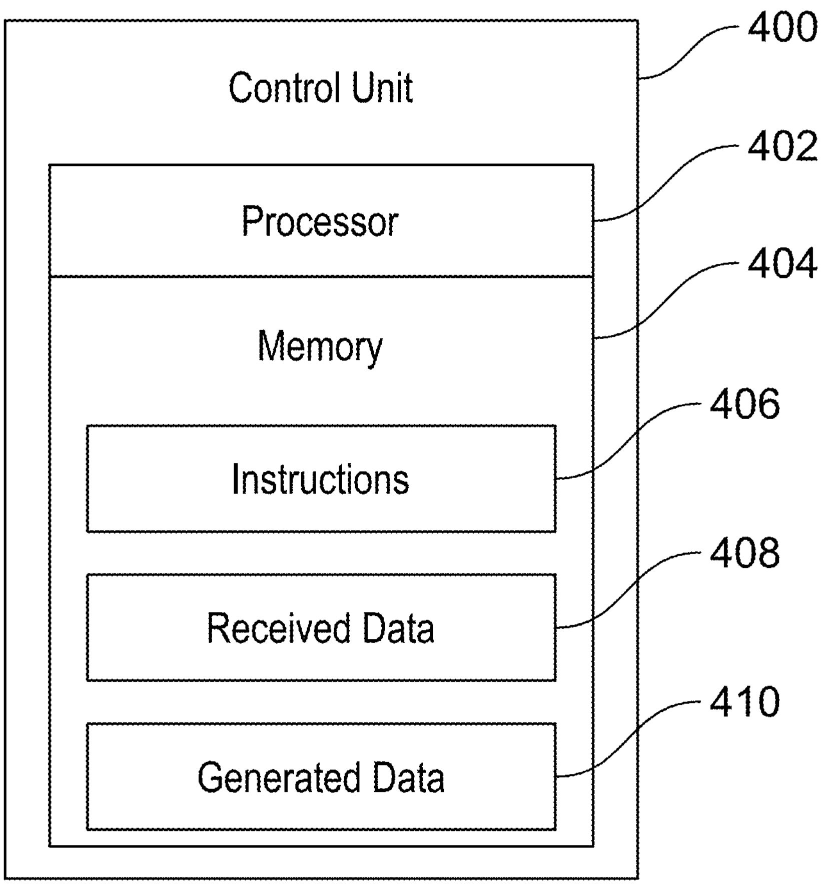
FIG. 4 illustrates a schematic block diagram of a control unit, according to an example of the present disclosure.

FIG. 4 illustrates a schematic block diagram of a control unit 400, according to an example of the present disclosure. The control unit 104 can be configured as the control unit 400. In at least one example, the control unit 400 includes at least one processor 401 in communication with a memory 402. The memory 402 stores instructions 404, received data 406, and generated data 408. The control unit 400 shown in FIG. 4 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 104 may be or include one or more processors that are configured to control operation, as described herein.

The control unit 104 is configured to execute a set of instructions that are stored in one or more data storage units or elements (such as one or more memories), in order to process data. For example, the control unit 104 may include or be coupled to one or more memories. The data storage units may also store data or other information as desired or needed. The data storage units may be in the form of an information source or a physical memory element within a processing machine.

The set of instructions may include various commands that instruct the control unit 104 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 104. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 104 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms “software” and “firmware” are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 5:
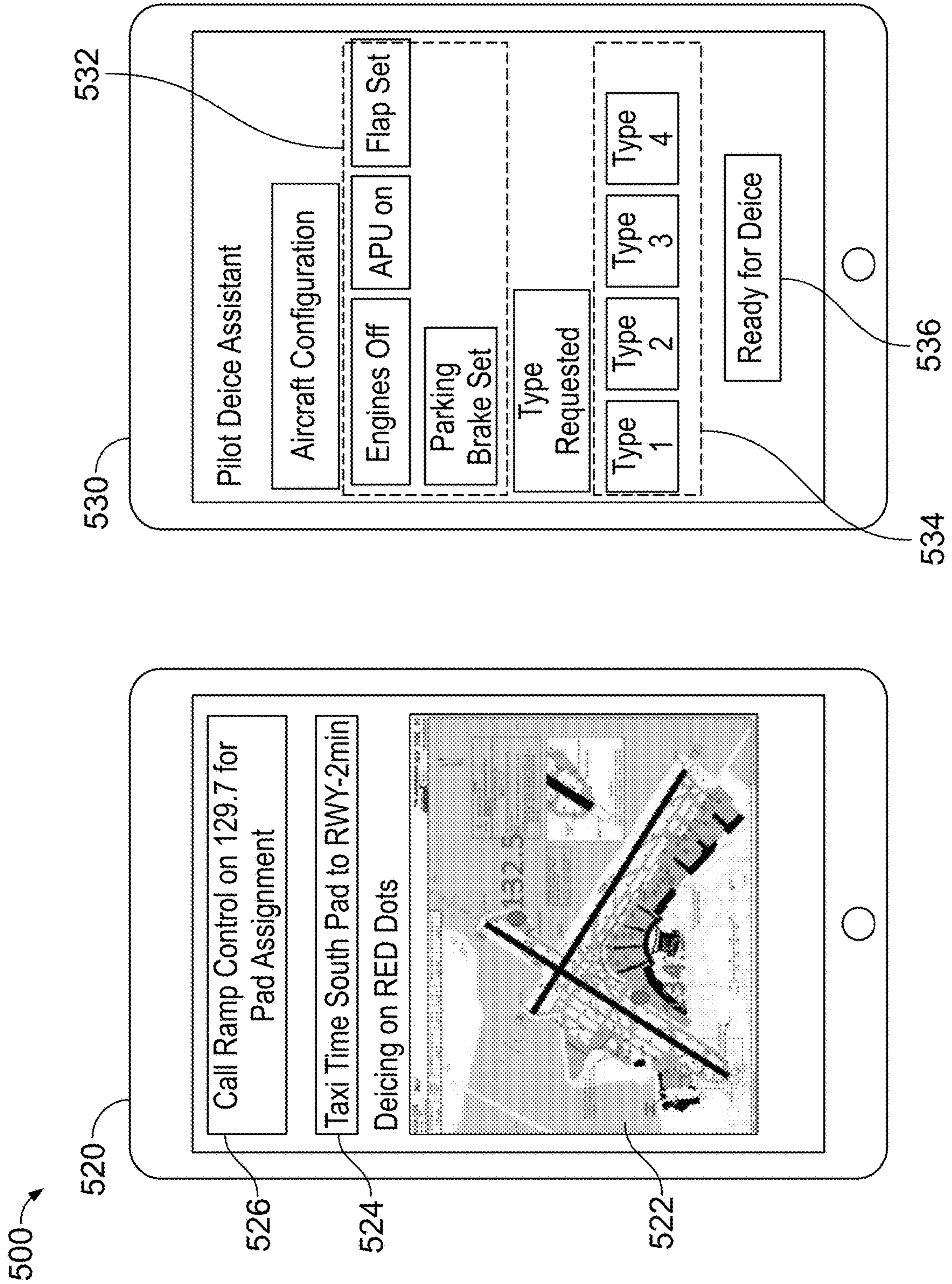
FIG. 5 illustrates a simplified view of a graphical user interface for communicating between an aircraft and a de-icing system during a de-icing event of the aircraft, according to an example of the present disclosure.
Figure 5:
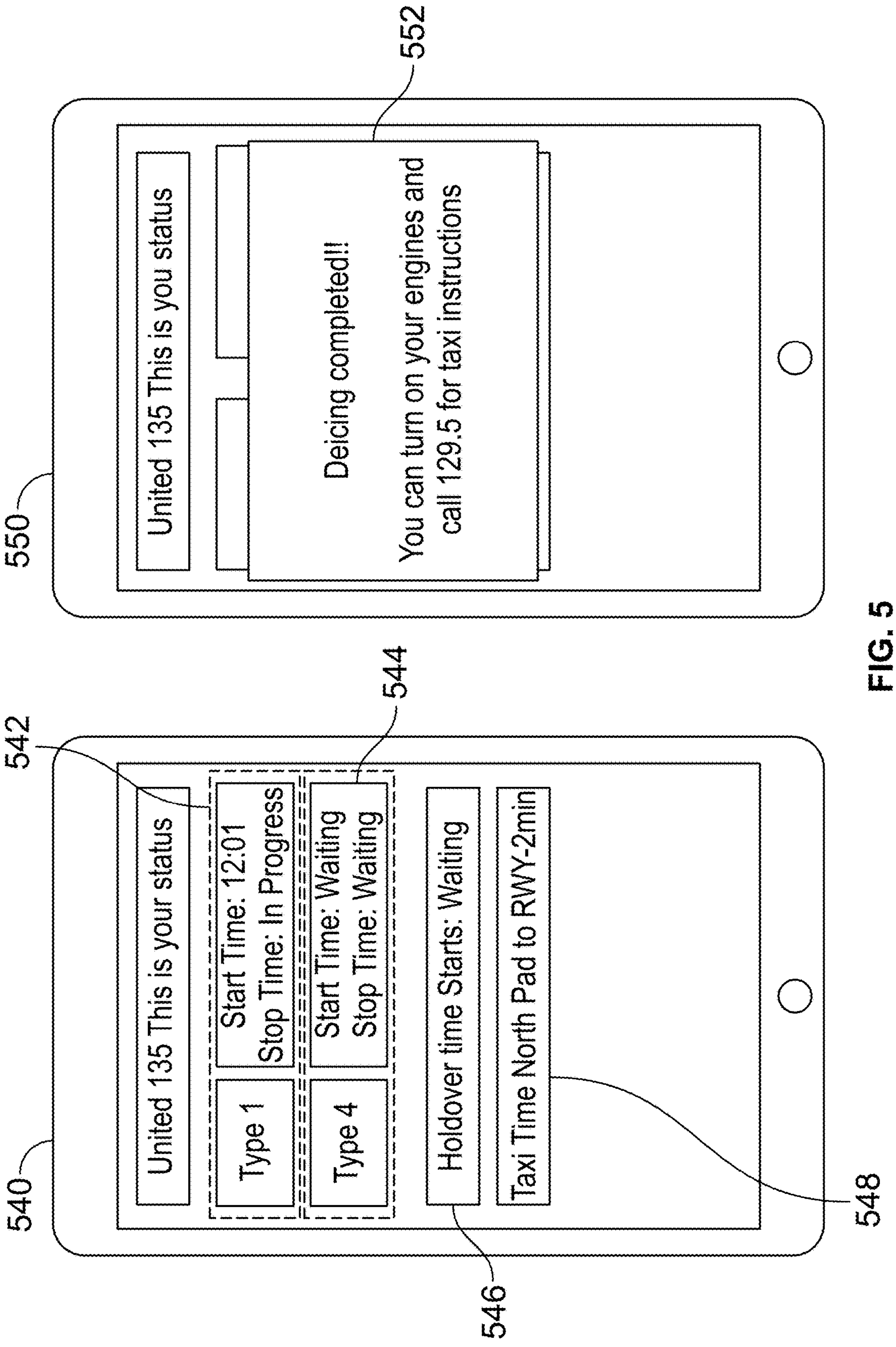

FIG. 5 illustrates a simplified view of a graphical user interface 500 for communicating between an aircraft 102 and a de-icing system 130 during a de-icing event of the aircraft 102, according to an example of the present disclosure. The graphical user interface 500 may be displayed to a pilot of the aircraft 102, such as via the display 108 of the system 100. In another example, the graphical user interface 500 may be displayed to an operator configured to control operation of the de-icing system 130 via the user interface 136 of the de-icing system 130. In another example, the graphical user interface 500 may be displayed to an operator of a central monitoring location of the airport 200, such as a control tower.

A first display screen 520 may include a first set of information 522. such as a map of the airport 200. The map can include information associated with a location of the aircraft, a location of one or more de-icing pads at the airport, etc. A second set of information 524 and a third set of information 526 can provide information to the pilot and/or the operator of the de-icing system. As one example, the second set of information 524 can indicate a transit time that it will take for the aircraft to move from a de-icing pad to one end of a runway (such as for takeoff); and the third set of information 526 can indicate a frequency at which the first communication system 122 and the second communication system 132 are to use to establish the bi-directional communication link 170. Optionally, the first display screen 520 can provide additional and/or alternative information to the pilot and/or operator of the de-icing system 130, such as current ambient weather conditions, forecasted ambient weather conditions, a position that the aircraft 102 is in line to receive the de-icing treatment relative to other aircrafts in line to receive a de-icing treatment, or the like.

In one or more examples, a second display screen 530 includes a status 532 of one or more systems of the aircraft. For example, in the illustrated embodiment, the status 532 includes a status of the engine(s) (e.g., the engines are powered off); a status of a power unit of the aircraft (e.g., the auxiliary power unit is on); a status of one or more flaps of the wings and/or stabilizers of the aircraft; and a status of a brake setting of the aircraft (e.g., the parking brake is set or engaged). The second display screen 530 also includes material options 534 that can be selected based on the materials that are needed for the de-icing event. In one example, material type 1 may be selected for a de-icing treatment; material type 2 may be selected for a de-icing treatment; material type 3 may be selected for de-icing and anti-icing treatments; and material type 4 may be selected for an anti-icing treatment. The different types of materials may be selected based on one or more of the current weather conditions, one or more forecasted weather conditions, based on how long the aircraft 102 has been at the airport 200, based on an amount of ice that has formed on exterior surfaces of the aircraft, based on a flight plan and/or destination of the aircraft 102, or the like.

The second display screen 530 also includes an activation icon 536. For example, subsequent to the control unit 104 determining that the one or more systems onboard the aircraft 102 are in appropriate states for starting a de-icing event, and subsequent to the control unit 104 automatically selecting and/or the pilot manually selecting one or more of the types of materials to be used for the de-icing event, the pilot may select the activation icon 536. Selecting the activation icon 536 communicates a command message to the operator of the de-icing system 130 that the aircraft 102 is ready to begin the de-icing event.

In one or more examples, a third display screen 540 includes command messages 542, 544 associated with status updates of the de-icing event. The command messages 542, 544 can indicate a status of each of the one or more types of materials that are to be applied to the aircraft 102 for the de-icing event. In the illustrated example, the material type 1 and the material type 4 were selected for the de-icing event. The material type 1 may be applied during a first portion of the de-icing event (e.g., a de-icing treatment), and the material type 4 may be applied during a second portion of the de-icing event (e.g., an anti-icing treatment). The first portion of the de-icing event may be required to be completed before the second portion of the de-icing event can begin. The status update 542 may communicate information to the pilot that indicates a start time and a stop time of application of the material type 1 (e.g., for the de-icing treatment), and the status update 544 may communicate information to the pilot that indicates a start time and a stop time of application of the material type 4 (e.g., for the anti-icing treatment).

The third display screen 540 also includes a command message 546 that may indicate a start of a holdover time for the aircraft 102. For example, the holdover time for the aircraft can represent the transit deadline (e.g., a maximum allowed time before the aircraft 102 is required to takeoff or depart from the airport 200) based on the current and/or forecasted weather conditions. The holdover time or the transit deadline may be based on a start time of the application of the material type 4 (e.g., for the anti-icing treatment). The third display screen 540 also includes a fourth set of information 548, that can include a transit time or a length of time that it will take for the aircraft to move from the de-icing pad to the end of the runway. In one or more examples, if the aircraft is unable to taxi to the end of the runway and take-off from the airport 200 within the transit deadline or holdover time, then the aircraft may be required to receive a second de-icing treatment.

In one or more examples, a fourth display screen 550 may include a completion notice 552 that communicates to the pilot that the de-icing event is complete. The completion notice 552 can include one or more instructions to the pilot, such as, but not limited to, instructions to turn the engines on, instructions to change the frequency of the first communication system 122 to a different frequency such as to communicate with a central monitoring location (e.g., a control tower) or with an air traffic controller, instructions indicating what runway the aircraft 102 should proceed towards, a transit deadline (e.g., how long the aircraft has to take off before another de-icing event may be required), or the like.

It is to be understood that the graphical user interface 500 can have an alternative arrangement of displayed information, can display additional and/or alternative information, and configured differently than shown in FIG. 5.

Referring to FIGS. 1-5, examples of the subject disclosure provide systems and methods that allow large amounts of data to be quickly and efficiently analyzed by a computing device. For example, the control unit 104 can analyze various aspects of aircraft 102, traffic, notifications, and the like. As such, large amounts of data, which may not be discernable by human beings, are being tracked and analyzed. The vast amounts of data are efficiently organized and/or analyzed by the control unit 104, as described herein. The control unit 104 analyzes the data in a relatively short time in order to quickly and efficiently determine fuel levels for various alternate flight plans for the aircraft 102. A human being would be incapable of efficiently analyzing such vast amounts of data in such a short time. As such, examples of the present disclosure provide increased and efficient functionality, and vastly superior performance in relation to a human being analyzing the vast amounts of data.

In at least one example, all or part of the systems and methods described herein may be or otherwise include an artificial intelligence (AI) or machine-learning system that can automatically perform the operations of the methods also described herein. For example, the control unit 104 can be an artificial intelligence or machine learning system. These types of systems may be trained from outside information and/or self-trained to repeatedly improve the accuracy with how data is analyzed. Over time, these systems can improve by determining such information with increasing accuracy and speed, thereby significantly reducing the likelihood of any potential errors. For example, the AI or machine-learning systems can learn and determine the performance capabilities of aircraft, traffic at airports, and the like, and automatically determine de-icing schedules for various aircrafts at airports. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determination of fuel levels for alternate flight plans. The training minimizes conflicts and interference by performing an iterative training algorithm, in which the systems are retrained with an updated set of data (for example, data received before, during, and/or after each flight of the aircraft 102) and based on the feedback examined prior to the most recent training of the systems. This provides a robust analysis model that can better determine situational information in a cost effective and efficient manner.

Figure 6:
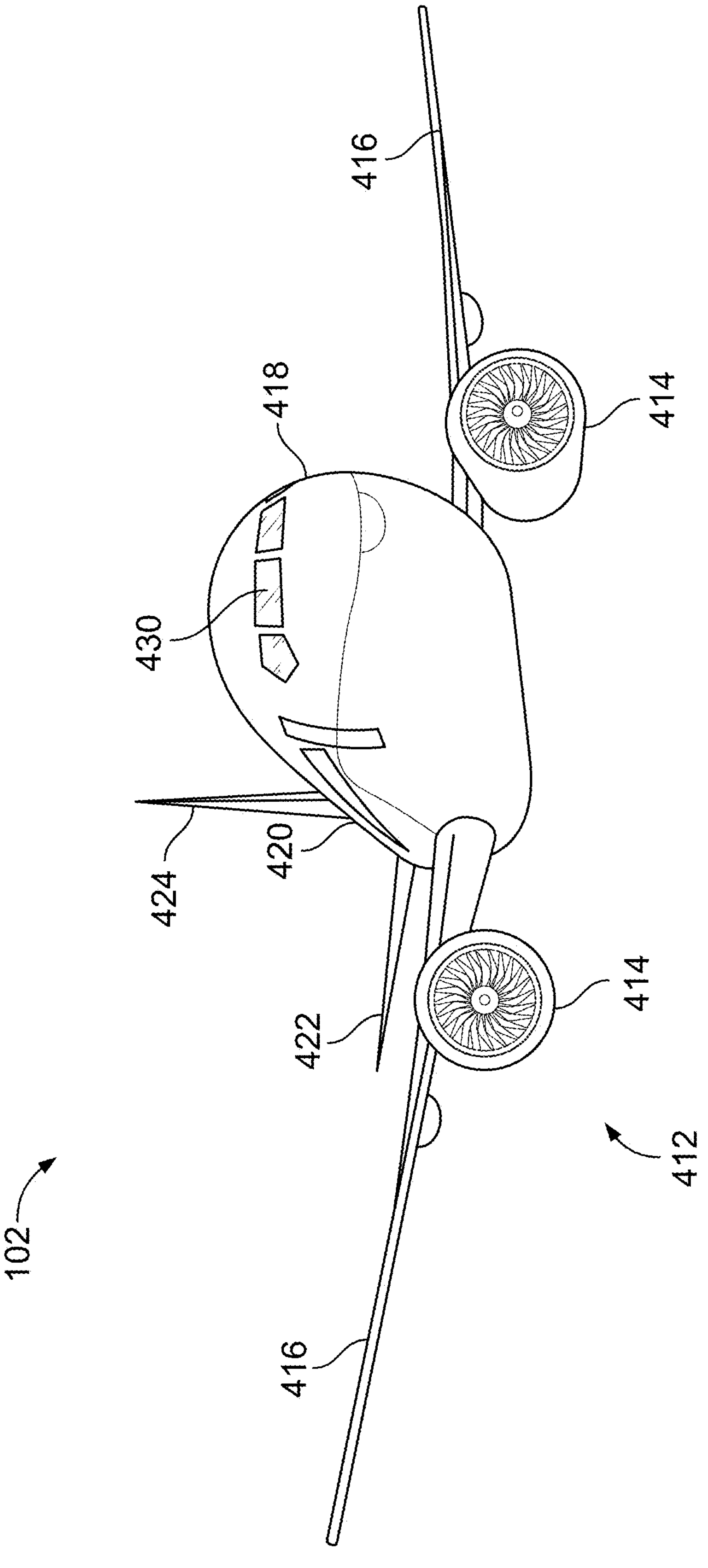
FIG. 6 illustrates a perspective front view of an aircraft, according to an example of the present disclosure.

FIG. 6 illustrates a perspective front view of the aircraft 102, according to an example of the present disclosure. The aircraft 102 includes a propulsion system 412 that includes engines 414, for example. Optionally, the propulsion system 412 may include more engines 414 than shown. The engines 414 are carried by wings 416 of the aircraft 102. In other examples, the engines 414 may be carried by a fuselage 418 and/or an empennage 420. The empennage 420 may also support horizontal stabilizers 422 and a vertical stabilizer 424. The fuselage 418 of the aircraft 102 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. FIG. 6 shows an example of an aircraft 102. It is to be understood that the aircraft 102 can be sized, shaped, and configured differently than shown in FIG. 6.

Further, the disclosure comprises examples according to the following clauses:

Clause 1: a system, comprising:

a first communication system configured to be onboard an aircraft; and a control unit having one or more processors configured to determine that one or more ambient conditions require a de-icing event of the aircraft, wherein the control unit is further configured to determine a location of the aircraft and a status of one or more systems of the aircraft, wherein the first communication system is configured to establish a bi-directional communication link with a second communication system of a de-icing system, and wherein the first communication system is configured to receive one or more command messages from the second communication system indicating a status of the de-icing event.

Clause 2: the system of clause 1, wherein the first communication system is configured to receive a completion notice from the second communication system, the completion notice indicating completion of the de-icing event.

Clause 3: the system of clause 2, wherein the control unit is configured to open the bi-directional communication link responsive to first communication system receiving the completion notice, wherein the first communication system is configured to be prohibited from communicating with the second communication system of the de-icing system responsive to the bi-directional communication link opening.

Clause 4: the system of clause 2, wherein the completion notice includes one or more instructions for controlling operation of the aircraft responsive to the completion of the de-icing event.

Clause 5: the system of clause 4, wherein the one or more instructions include a transit deadline, wherein the aircraft is required to depart before the transit deadline.

Clause 6: the system of clause 5, wherein the de-icing event includes a first portion and a second portion that is configured to be completed subsequent to completion of the first portion, wherein the transit deadline is based on a start time of the second portion of the de-icing event.

Clause 7: the system of clauses 1-6, wherein the control unit is configured to select one or more materials to be used in the de-icing event, the one or more materials that are selected based on the one or more ambient conditions.

Clause 8: the system of clause 7, wherein the first communication system is configured to communicate a command message to the second communication system indicating the one or more materials selected for the de-icing event.

Clause 9: the system of clauses 1-8, wherein the location of the aircraft is a first location, wherein the control unit is configured to control a propulsion system of the aircraft to move the aircraft from the first location to a second location responsive to completion of the de-icing event.

Clause 10: the system of clauses 1-9, wherein the status of the one or more systems includes one or more of a setting of a power system of the aircraft, a brake setting of the aircraft, a setting of the first communication system, an engine setting of a propulsion system of the aircraft, a time at which the engine setting changed, a setting of a thermal management system of the aircraft, or the setting of the thermal management system relative to the engine setting.

Clause 11: a method, comprising:

determining that one or more ambient conditions require a de-icing event of an aircraft;

determining a location of the aircraft and a status of one or more systems of the aircraft;

establishing a bi-directional communication link between a first communication system configured to be onboard the aircraft and a second communication system of a de-icing system; and receiving one or more command messages indicating a status of the de-icing event.

Clause 12: the method of clause 11, further comprising receiving a completion notice indicating completion of the de-icing event, wherein the completion notice includes one or more instructions for controlling operation of the aircraft responsive to the completion of the de-icing event.

Clause 13: the method of clause 12, further comprising opening the bi-directional communication link responsive to receiving the completion notice, wherein the first communication system is configured to be prohibited from communicating with the second communication system of the de-icing system responsive to the bi-directional communication link opening.

Clause 14: the method of clause 12, wherein the one or more instructions include a transit deadline, wherein the aircraft is required to depart before the transit deadline.

Clause 15: the method of clause 14, wherein the de-icing event includes a first portion and a second portion that is configured to be completed subsequent to completion of the first portion of the de-icing event, wherein the transit deadline is based on a start time of the second portion of the de-icing event.

Clause 16: the method of clauses 11-15, further comprising selecting one or more materials to be used in the de-icing event, the one or more materials that are selected based on the one or more ambient conditions.

Clause 17: the method of clause 16, further comprising communicating a command message to the second communication system indicating the one or more materials selected for the de-icing event.

Clause 18: the method of clauses 11-17, wherein the location is a first location, and further comprising controlling a propulsion system of the aircraft to move the aircraft from the first location to a second location responsive to completion of the de-icing event.

Clause 19: the method of clauses 11-18, wherein the status of the one or more systems includes one or more of a setting of a power unit of the aircraft, a brake setting of the aircraft, a setting of the first communication system, an engine setting of a propulsion system of the aircraft, a time at which the engine setting changed, a setting of a thermal management system of the aircraft, or the setting of the thermal management system relative to the engine setting.

Clause 20: A non-transitory computer-readable storage medium comprising executable instructions that, in response to execution, cause one or more controls units comprising a processor, to perform operations comprising:

determining that one or more ambient conditions require a de-icing event of an aircraft;

determining a location of the aircraft and a status of one or more systems of the aircraft;

establishing a bi-directional communication link between a first communication system configured to be onboard the aircraft and a second communication system of a de-icing system configured to be off-board the aircraft;

receiving one or more command messages indicating a status of the de-icing event;

receiving a completion notice indicating completion of the de-icing event, wherein the completion notice includes one or more instructions for controlling operation of the aircraft responsive to the completion of the de-icing event; and opening the bi-directional communication link responsive to receiving the completion notice, wherein the first communication system is configured to be prohibited from communicating with the second communication system of the de-icing system responsive to the bi-directional communication link opening.

As described herein, examples of the present disclosure provide systems and methods for automatically communicating between an aircraft and a de-icing system. The communication systems of the aircraft and de-icing system can allow a pilot to communicate directly with an operator of the de-icing system, to understand a status of a de-icing event, and to control operation of the aircraft responsive to the completion of the de-icing event.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a first communication system configured to be onboard an aircraft;

a graphical user interface (GUI) including a display screen; and a control unit having one or more processors configured to determine that one or more ambient conditions require a de-icing event of the aircraft, the control unit configured to determine a status of one or more systems of the aircraft and automatically control operation of one or more of the systems of the aircraft to change the status of one or more of the systems of the aircraft responsive to determine that the status of one or more of the systems of the aircraft are not prepared for the de-icing event, wherein the control unit is configured to display via the display screen of the GUI a location of the aircraft and the status of the one or more systems of the aircraft, wherein the control unit is configured to determine a first communication frequency at which the first communication system is configured to communicate and the first communication system is configured to establish a bi-directional communication link with a second communication system of a de-icing system at the first communication frequency determined by the control unit, wherein the first communication system is configured to receive one or more command messages from the second communication system indicating a status of the de-icing event, wherein the control unit is configured to automatically change display of the GUI in real-time to display the status of the de-icing event responsive to receiving the one or more command messages, and wherein the control unit is configured to change the display of the GUI to include one or more instructions for an operator of the aircraft responsive to completion of the de-icing event.

2. The system of claim 1, wherein the first communication system is configured to receive a completion notice from the second communication system, the completion notice indicating the completion of the de-icing event.

3. The system of claim 2, wherein the control unit is configured to open the bi-directional communication link responsive to first communication system receiving the completion notice, wherein the first communication system is prohibited from communicating with the second communication system of the de-icing system responsive to the bi-directional communication link opening.

4. The system of claim 2, wherein the one or more instructions include instructions for controlling operation of the aircraft responsive to receiving the completion notice indicating the completion of the de-icing event.

5. The system of claim 4, wherein the one or more instructions include a transit deadline, wherein the aircraft is required to depart before the transit deadline.

6. The system of claim 5, wherein the de-icing event is configured to include a first portion and a second portion that is configured to be completed subsequent to completion of the first portion, wherein the transit deadline is based on a start time of the second portion of the de-icing event.

7. The system of claim 1, wherein the control unit is configured to select one or more materials to be used in the de-icing event, the one or more materials that are selected based on the one or more ambient conditions.

8. The system of claim 7, wherein the first communication system is configured to communicate a command message to the second communication system indicating the one or more materials that are selected for the de-icing event.

9. The system of claim 1, wherein the location of the aircraft is a first location, wherein the control unit is configured to control a propulsion system of the aircraft to move the aircraft from the first location to a second location responsive to completion of the de-icing event.

10. The system of claim 1, wherein the status of the one or more systems includes one or more of a setting of a power system of the aircraft, a brake setting of the aircraft, a setting of the first communication system, an engine setting of a propulsion system of the aircraft, a time at which the engine setting changed, a setting of a thermal management system of the aircraft, or the setting of the thermal management system relative to the engine setting.

11. A method comprising:

determining that one or more ambient conditions require a de-icing event of an aircraft;

automatically controlling operation of one or more systems of the aircraft with a control unit to change a status of one or more of the systems of the aircraft responsive to determining that the status of one or more of the systems of the aircraft are not prepared for the de-icing event;

displaying, via a display screen of a graphical user interface (GUI), a location of the aircraft and status of the one or more systems of the aircraft;

determining, with the control unit, a first communication frequency at which a first communication system onboard the aircraft is configured to communicate with a second communication system of a de-icing system;

establishing a bi-directional communication link between first communication system and the second communication system responsive to determining that the de-icing event is required;

receiving one or more command messages indicating a status of the de-icing event, wherein receiving the one or more command messages is configured to automatically trigger the control unit to change display of the GUI in real-time to display the status of the de-icing event; and changing display of the GUI in real-time responsive to completion of the de-icing event to include one or more instructions for an operator of the aircraft.

12. The method of claim 11, further comprising receiving a completion notice indicating completion of the de-icing event, and changing display of the GUI to display the one or more instructions for controlling operation of the aircraft responsive to receiving the completion notice.

13. The method of claim 12, further comprising opening the bi-directional communication link responsive to receiving the completion notice, wherein the first communication system is prohibited from communicating with the second communication system of the de-icing system responsive to the bi-directional communication link opening.

14. The method of claim 11, wherein the one or more instructions include a transit deadline, wherein the aircraft is required to depart before the transit deadline.

15. The method of claim 14, wherein the de-icing event includes a first portion and a second portion that is configured to be completed subsequent to completion of the first portion of the de-icing event, wherein the transit deadline is based on a start time of the second portion of the de-icing event.

16. The method of claim 11, further comprising receiving a selection, via the GUI, of one or more materials to be used in the de-icing event, the one or more materials that are selected based on the one or more ambient conditions.

17. The method of claim 16, further comprising communicating a command message to the second communication system indicating the one or more materials selected for the de-icing event.

18. The method of claim 11, wherein the location is a first location, and further comprising controlling a propulsion system of the aircraft to move the aircraft from the first location to a second location responsive to completion of the de-icing event.

19. The method of claim 11, wherein the status of the one or more systems includes one or more of a setting of a power unit of the aircraft, a brake setting of the aircraft, a setting of the first communication system, an engine setting of a propulsion system of the aircraft, a time at which the engine setting changed, a setting of a thermal management system of the aircraft, or the setting of the thermal management system relative to the engine setting.

20. A non-transitory computer-readable storage medium comprising executable instructions that, in response to execution, cause one or more control units comprising a processor, to perform operations comprising:

determining that one or more ambient conditions require a de-icing event of an aircraft;

automatically controlling operation of one or more systems of the aircraft with the one or more control units to change a status of one or more of the systems of the aircraft responsive to determining that the status of one or more of the systems of the aircraft are not prepared for the de-icing event;

displaying, via a display screen of a graphical user interface (GUI), a first location of the aircraft and the status of one or more systems of the aircraft;

establishing a bi-directional communication link between a first communication system of the aircraft and a second communication system of a de-icing system at a first communication frequency determined by one or more of the control units responsive to determining that the de-icing event is required;

receiving one or more command messages indicating a status of the de-icing event, wherein receiving the one or more command messages is configured to automatically trigger the one or more control units to change display of the GUI in real-time to display the status of the de-icing event;

receiving a completion notice indicating completion of the de-icing event, wherein the completion notice includes one or more instructions for controlling operation of the aircraft responsive to the completion of the de-icing event;

changing display of the GUI to display the one or more instructions associated with the completion notice;

changing one or more operating settings of the first communication system to communicate at a different, second communication frequency responsive to receiving the completion notice, wherein changing the one or more operating settings of the first communication system includes opening the bi-directional communication link, wherein the first communication system is prohibited from communicating with the second communication system of the de-icing system responsive to the bi-directional communication link opening; and automatically controlling operation of one or more of the systems of the aircraft with one or more of the control units to control movement of the aircraft away from a location of the de-icing event in response to completion of the de-icing event.

* * * * *